US012072757B2

(12) United States Patent
Sethi et al.

(10) Patent No.: US 12,072,757 B2
(45) Date of Patent: Aug. 27, 2024

(54) DATA PROCESSING SYSTEM WITH TAG-BASED QUEUE MANAGEMENT

(71) Applicant: NXP B.V., Eindhoven (NL)

(72) Inventors: Ankush Sethi, Austin, TX (US); Rohit Kumar Kaul, Austin, TX (US); James Andrew Welker, Leander, TX (US); Vaibhav Kumar, Austin, TX (US); Jehoda Refaeli, Austin, TX (US)

(73) Assignee: NXP B.V., Eindhoven (NL)

( * ) Notice: Subject to any disclaimer, the term of this patent is extended or adjusted under 35 U.S.C. 154(b) by 5 days.

(21) Appl. No.: 17/976,623

(22) Filed: Oct. 28, 2022

(65) Prior Publication Data
US 2024/0143432 A1    May 2, 2024

(51) Int. Cl.
*G06F 11/07*    (2006.01)
(52) U.S. Cl.
CPC ........ *G06F 11/079* (2013.01); *G06F 11/0721* (2013.01)
(58) Field of Classification Search
CPC .......................... G06F 11/079; G06F 11/0721
See application file for complete search history.

(56) References Cited

U.S. PATENT DOCUMENTS

| | | | |
|---|---|---|---|
| 7,020,800 B2 | 3/2006 | Fu et al. | |
| 7,913,124 B2 * | 3/2011 | Udell | G06F 11/0751 714/49 |
| 11,314,545 B2 * | 4/2022 | Gokavarapu | G06F 11/0721 |
| 11,436,070 B2 * | 9/2022 | Ugale | G06F 9/466 |
| 2011/0138252 A1 | 6/2011 | Pawlowski et al. | |
| 2017/0177368 A1 | 6/2017 | Dehon et al. | |
| 2022/0391283 A1 * | 12/2022 | Thompson | G06F 9/52 |

OTHER PUBLICATIONS

Sullivan et al.: "The Dover inherently secure processor", 2017 IEEE International Symposium on Technologies for Homeland Security (HST), IEEE, Apr. 25, 2017, pp. 1-5.
Dhawan et al., "PUMP: A Programmable Unit for Metadata Processing", Proceedings of the Third Workshop on Hardware and Architectural Support for Security and Privacy, HASP '14, Jan. 1, 2014 pp. 1-8.
Roessler, Nick, "Policy Implementation and Engineering for Tagged Architectures", Jan. 1, 2021, 143 pages.
Jero, Samuel et al., "TAG: Tagged Architecture Guide", ACM Computing Surveys, vol. 55, No. 6, May 1, 2022, pp. 1-34.

* cited by examiner

*Primary Examiner* — Nadeem Iqbal

(57) ABSTRACT

An aspect of the invention is directed towards a data processing system and method including a transaction scheduler configured to process transactions, a tag control circuit coupled to the transaction scheduler configured to detect a fault by comparing output signals, and a controller coupled to the tag control circuit. The controller is configured to receive a transaction request identifying a transaction, generate a unique tag value for the transaction request, load the unique tag value into the transaction scheduler, determine a current unique tag value associated with the transaction being executed, and generate a fault. The system is further configured to generate fault when: (i) the current unique tag value is not found, or (ii) the transactions timeout after a predetermined number of cycles.

19 Claims, 6 Drawing Sheets

DATA PROCESSING SYSTEM WITH TAG-BASED QUEUE MANAGEMENT

BACKGROUND

Field

The present invention generally relates to a data processing system with improved transaction queue management and, more specifically, to a data processing system that utilizes a queue management and task scheduling system that uses unique tags to track processing of transactions, execute transactions, and provide improved data integrity.

SUMMARY

Accordingly, the invention is directed to transaction scheduling that utilizes unique transaction tags to provide improved queue management integrity.

Additional features and advantages of the invention will be set forth in the description which follows and in part will be apparent from the description or may be learned by practice of the invention. The objectives and other advantages of the invention will be realized and attained by the structure, particularly pointed out in the written description and claims hereof as well as the appended drawings.

To achieve these and other advantages and in accordance with the purpose of the present invention, as embodied and broadly described, an aspect of the invention is directed towards a data processing system. The data processing system includes a transaction scheduler configured to process transactions, a tag control circuit coupled to the transaction scheduler configured to detect a fault by comparing output signals, and a controller coupled to the tag control circuit. The controller is configured to receive a transaction request identifying a transaction, generate a unique tag value for the transaction request, load the unique tag value into the transaction scheduler, determine a current unique tag value associated with the transaction being executed, and generate a fault. The system is further configured to generate fault when: (i) the current unique tag value is not found or (ii) the transactions timeout after a predetermined number of cycles.

Another aspect of the invention is directed towards a data processing system including a tag control circuit configured to detect a fault by comparing output signals and controller coupled to the tag control circuit. The controller is configured to determine whether a fault corresponds to one or more of i) a mismatch in a unique tag value associated with a transaction and a current tag value of a current transaction, ii) a timed out transaction, and iii) a transaction that is not associated with a unique tag value.

Yet another aspect of the invention is directed towards a method of operating a data processing system. The method includes detecting a fault by comparing output data with a first unique tag value from a transaction scheduler module with input data with a second unique tag value input into a read buffer when the first unique tag value matches the second unique tag value complete the processing.

This Summary section is neither intended to be, nor should be, construed as being representative of the full extent and scope of the present disclosure. Additional benefits, features and embodiments of the present disclosure are set forth in the attached figures and in the description hereinbelow, and as described by the claims. Accordingly, it should be understood that this Summary section may not contain all of the aspects and embodiments claimed herein.

Additionally, the disclosure herein is not meant to be limiting or restrictive in any manner. Moreover, the present disclosure is intended to provide an understanding to those of ordinary skill in the art of one or more representative embodiments supporting the claims. Thus, it is important that the claims be regarded as having a scope including constructions of various features of the present disclosure insofar as they do not depart from the scope of the methods and apparatuses consistent with the present disclosure (including the originally filed claims). Moreover, the present disclosure is intended to encompass and include obvious improvements and modifications of the present disclosure.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

Figure 1:
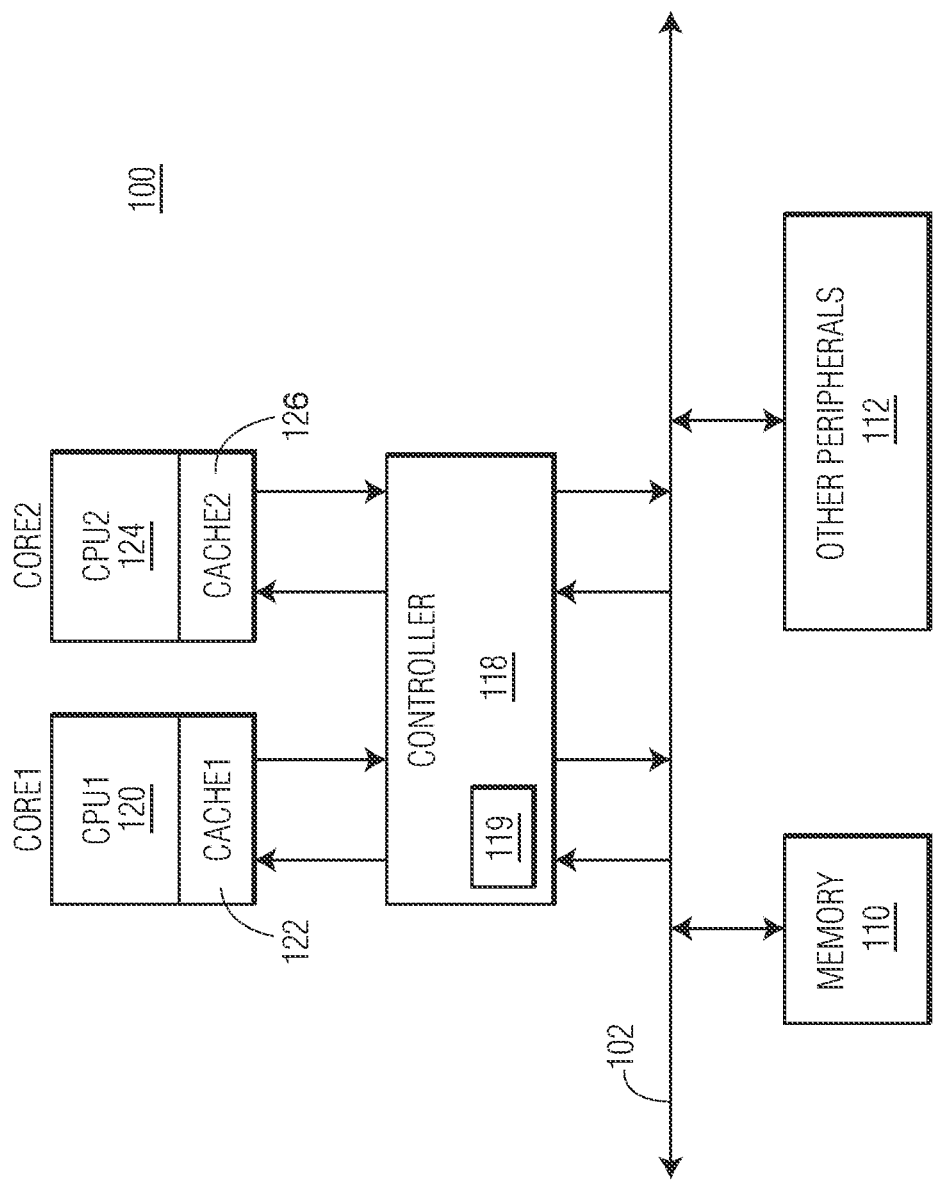
FIG. 1 illustrates, in simplified block diagram form, an exemplary data processing system environment in accordance with an embodiment of the present invention.

The following detailed description is merely illustrative in nature and is not intended to limit the embodiments of the subject matter of the application and uses of such embodiments. As used herein, the words "exemplary" and "example" mean "serving as an example, instance, or illustration." Any implementation or embodiment described herein as exemplary or an example is not necessarily to be construed as preferred or advantageous over other implementations. Furthermore, there is no intention to be bound by any expressed or implied theory presented in the preceding technical field, background, or the following detailed description.

Generally, it is important that data processing systems execute a transaction in a well-defined and controlled order. Typically, the order in which transactions should be executed is determined by a scheduling subsystem that designates particular transactions for execution based on the availability of resources needed for the transaction and other factors that may allow the transaction sequence to be optimized for performance. In addition, the system is configured to protect against potential errors with non-sequential operations.

To optimize the transaction sequence, therefore, a scheduler may assign transactions for execution in an order that is different from the order in which the transactions were received. Due to the potential for non-sequential execution of the transaction, therefore, there can be a risk that a transaction may become corrupted due to some resources (e.g., data, instructions, etc.) that are used in executing a particular transaction being instead intended for a different transaction. The faults detected by the system can be permanent faults, e.g., due to manufacturing or aging of a device, or transients, e.g., cosmic events leading to bit flips.

Conventional data processing systems may use several techniques in an attempt to ensure data integrity. For example, memory systems will often utilize error correction code (ECC) in an attempt to detect when a particular value stored in memory (cache or otherwise) has become corrupted. Unfortunately, although ECC-checks can detect the corruption of a particular value in memory, such checks cannot detect when a transaction is out of order. As such, a particular value in memory may appear to be correct in view of an ECC-check, even though the value may include the wrong data to be processed by the current transaction.

Similarly, some data processing systems use a lockstep computing approach to ensure data integrity. This approach typically involves the data processing system implementing two (or more) separate and independent processor subsystems. During the execution of a transaction, each separate independent processor subsystem is assigned the transaction and independently executes the assigned transaction. The outputs from the two independent processor subsystems are then compared and if equal, it can be determined that the transaction has been executed correctly (i.e., if there was an error in data processing, the outputs of the two independent processor subsystems would not be equal). Again, however, this lockstep processing can be a useful technique to provide data integrity.

Consequently, the present disclosure provides an improved data processing system and method for operating a transaction queue and scheduling system utilizing transaction tags to provide improved integrity of the data processing system's queue management and transaction scheduling. The present system may provide improved queue management integrity in a data processing system that utilizes a single processor. Or alternatively, the present system may be utilized, as described herein, in conjunction with a data processing system that utilizes lockstep functionality to implement two or more independent processor systems. In such lockstep data processing systems, the present system and method may be considered a low overhead solution, e.g., a solution to minimize the die size, as it may only require a single transaction scheduler configured to interact with each independent processor subsystem and does not require multiple transaction scheduler to be implemented within the die.

In general, the present system and method are configured to associate unique tag values with particular transactions to be executed by the processing system. Those unique tag values are stored in the scheduler and may identify a set of transactions configured to be executed by the processing system. When a particular transaction is executed, the unique tag value for the transaction is generated in the controller configured to execute the transaction. The controller is further configured to store the tag value for the transaction that is currently being executed. After a transaction is completed, the scheduler compares the tag value of the transaction that has just been completed (i.e., as received from the controller) to the tag value stored in the transaction scheduler as the transaction currently being executed. If the two values match, the scheduler can determine that the processor executed the correct transaction. If the values do not match, that can indicate the transaction was not executed properly, and an appropriate error message or fault can be triggered.

In a specific embodiment of the present system and method, the processing system implements a series of tag checkers to ensure the transaction scheduler and other processing system control logic are shifting queues and transferring transactions as expected and transactions are not being lost or processed out of the expected order.

After a request for a transaction is received on an input bus to the processing system (e.g., advanced eXtensible Interface (AXI)) a controller (e.g., a double-data rate controller (DDRC)) generates a unique tag that will be associated with that specific transaction. The tag generation, in one embodiment, may be executed within lockstep circuitry. After the unique tag value is generated, the tag value is transferred to the transaction scheduler for storage until that transaction has finished processing. During processing of the transaction, the unique tag value is tracked or carried with the transaction through the executing processing subsystem until the transaction has been completed (or until particular steps, such as a memory read or a memory write associated with the transaction, have been completed). In a transaction involving a read operation, for example, the unique tag associated with the transaction can be compared against the tag value stored in the scheduler during the read response with the given transaction. Similarly, in a transaction involving a write operation, the unique tag value can be checked when the write data is issued for storage in the memory.

When checking the tag value of an in-process transaction, any detected faults or discrepancies between the tag value and the tag value stored in the processing system's scheduler can result in the generation of a corresponding tag fault. Similarly, if a tag checker within the processing system determines the oldest tag has not been completed in the maximum allowable time, e.g., a predetermined number of cycles or transactions, the tag checker can assert a fault for the tag timeout. If a tag checker finds a tag mismatch when a transaction is in process or has been completed, the tag fault can also be asserted for this scenario.

In accordance with the present system and method, a processing system can be configured to provide precise control of the management of transaction schedules, the order of address transactions being utilized during transaction execution, and other predetermined criteria.

The present system and method may be utilized in a number of different processing environments with other error correction and data integrity techniques as known in the art, e.g., error correction code (ECC), lockstep, and the like.

FIG. 1 illustrates, in simplified block diagram form, an exemplary data processing system environment with a lockstep implementation in accordance with an embodiment of the present invention.

Referring to FIG. 1, an exemplary data processing system 100 and general computational environment that can be used with embodiments described herein. FIG. 1 depicts a processing system 100. Optionally and/or alternatively, the system can also be configured to implement a lockstep process. However, as discussed herein, the present tag-based transaction scheduling and queue management system may be utilized in conjunction with processing system 100s that do not include lockstep based processing.

In this embodiment, the system 100 may be characterized as a system-on-a-chip (SoC). Processing system 100 includes a system bus 102 and optionally two or more core domains, controller 118, memory 110, and optionally other peripherals 112. When using optional core domains, they would include processing cores 114 and 116. Controller 118, memory 110, and other peripherals 112 are each bidirectionally coupled to the system bus 102 by way of respective communication buses.

System bus 102 may include any type of bus, switch fabric, network on chip (NoC), and the like for interconnecting and communicating any type of information, such as data, address, instructions, interrupts, and control. System bus 102 provides a communication backbone for transactions such as writes to memory, data transfers, etc., as well as communication of other information. In particular, system bus 102 provides a communication backbone for transactions among optional core domains, controller 118, memory 110, and other peripherals 112. Optionally and/or alternatively, there may be more than two core domains.

Cores 114 and 116 are coupled to system bus 102. Processing cores 114 and 116 each include a processor (120, 124) and CACHE1 memory and CACHE2 memory (122, 126), respectively. Processor 120, labeled CPU1, is coupled to CACHE1 memory 122, and processor 124, labeled CPU2, is coupled to CACHE2 memory 126.

Optionally and/or alternatively, test circuitry such as logic built-in self-test (LBIST) is coupled to each of CPU1 and CPU2, and memory built-in self-test (MBIST) is coupled to each of CACHE1 and CACHE2 memory. CPU1 and CPU2 may include any type of circuits for processing, computing, etc., such as a state machine, a microprocessor unit (MPU), a microcontroller unit (MCU), a digital signal processor (DSP), and other suitable types of processing units. In this embodiment, cores 114 and 116 are virtually identical to one another, having like architecture and circuitry, for example.

Processing system 100 may include multiple core domains like core domain, in such case, each core domain including processing cores like cores 114 and 116, shared memory (not shown), control circuitry and a controller 118, interrupt circuitry (not shown), and other peripheries. Controller 118 includes a transaction scheduler 119 for processing transactions with tags described herein. The transaction scheduler 119 includes circuitry configured for processing tags, deallocation of transactions, and generation of faults as described herein. When using core domains that may be configured to operate independently from each core domain if utilized, such as in multi-processing or multi-threaded processing systems. In some embodiments, a core domain may have different cores, memory, and other circuitry. In some embodiments, cores 114 and 116 in core domains may each include multiple cores like cores 114 and 116. For example, core 114 may include two cores having two processors, like CPU1, coupled to cache memories like CACHET, and core 116 may be coupled to CACHE2.

Cores 114 and 116 are generally configured to execute sets of instructions in order to carry out designated tasks. In the course of executing instructions, cores 114 and 116 can generate transactions such as writes to memory, data transfers, etc. Cores 114 and 116 may also be configured to operate in a degraded mode where one core is disabled, and the other core operates independently. Or, as described above, processing system 100 may be configured with only a single one of processor 120 and processor 124 and may be implemented as a single processor processing system 100.

In one embodiment, when operating in a lockstep mode, one core may shadow the other by executing the same instructions and generating the same transactions. For example, core 114, labeled CORE1, and core 116, labeled CORE2, may be configured to operate in a lockstep mode (e.g., as a lockstep pair) using a lockstep control block such that CORE2 shadows CORE1, allowing outputs of each core to be compared with one another for inconsistencies. By comparing the outputs of the lockstep pair, a level of safety in the data processing system 100 can be assured because hard and soft errors are detectable. In this embodiment, when CORE2 shadows CORE1, outputs of CORE2 are used only for comparison and are decoupled from system bus 102 accordingly. The term "shadows," as used herein, refers to executing the same instructions and generating the same transactions.

Controller 118 is coupled to system bus 102 and transaction scheduler 119. Controller 118 and transaction scheduler 119 are generally configured to execute instructions and respond to received interrupt signals to carry out designated tasks.

Within processing system 100, memory 110 may include any type of volatile or non-volatile memory array cells, such as static random-access memory (SRAM), dynamic random-access memory (DRAM), flash memory, and the like. Processing system 100 may include multiple memories like memory 110 or a combination of different memory types. For example, processing system 100 may include a flash memory in addition to an SRAM 110.

Other peripherals 112 of processing system 100 may include any number of other circuits and functional hardware blocks such as accelerators, timers, counters, communications, interfaces, analog-to-digital converters, digital-to-analog converters, PLLs, and the like for example. Each of the other circuits and functional hardware blocks included in other peripherals 112 may be coupled to the system bus 102 by way of respective communication buses.

Figure 2:
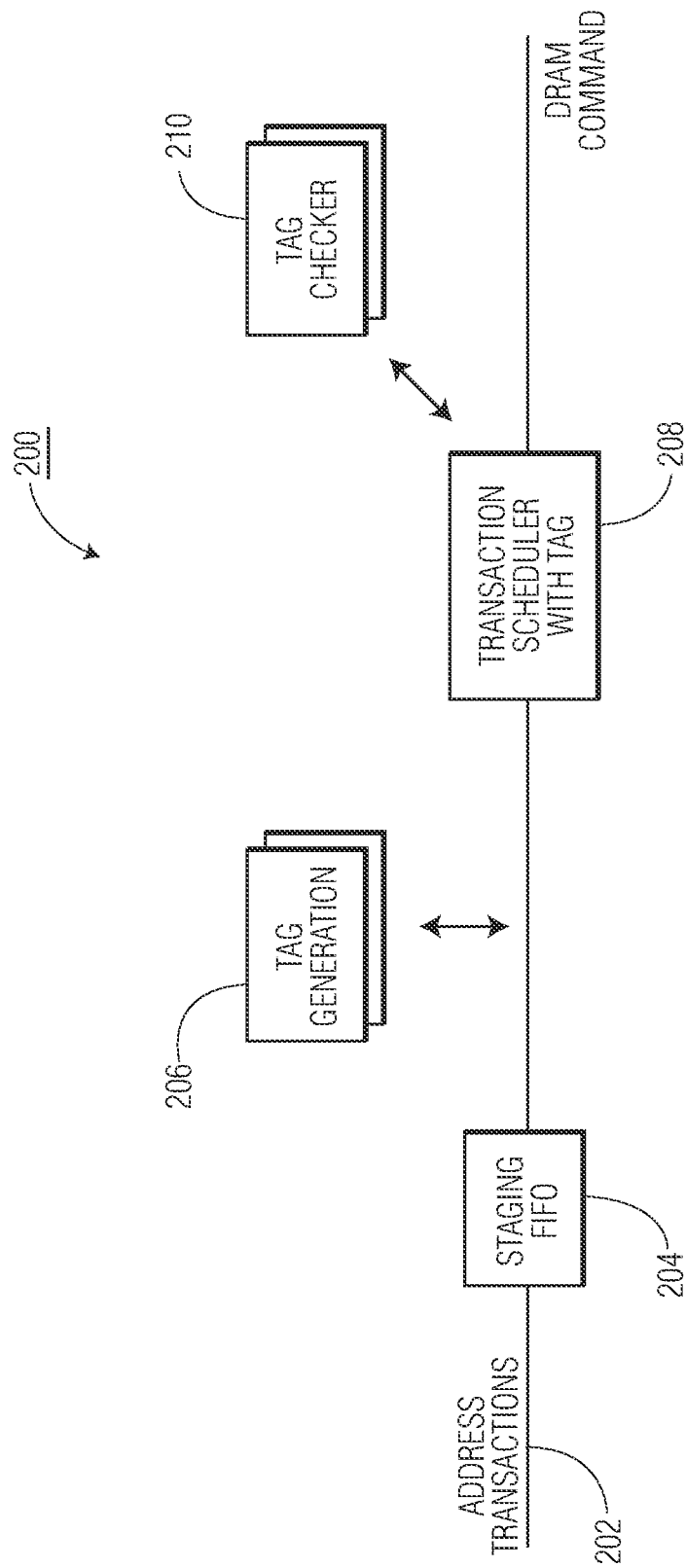
FIG. 2 illustrates, in simplified block diagram form, an exemplary data processing flow in accordance with another embodiment of the present invention.

To illustrate the operation of processing system 100 and the use of tag values to control transaction scheduling, FIG. 2 illustrates an exemplary data processing flow in simplified block diagram form in accordance with another embodiment of the present invention that may be implemented by controller 118 of FIG. 1.

Referring to FIG. 2, a data processing flow 200 is provided. The processing flow 200 depicts the data processing flow on a memory command channel 202 of the processing system as well as the corresponding processing flow on a memory command channel 202. Typically, the memory command channel 202 is utilized for the receipt and processing of transaction information that requires scheduling and execution of transactions.

The memory command channel 202 and related flow involve the processing system receiving an input comprising data, e.g., address transactions or other data. The received transactions are input into a staging module 204, e.g., an AXI staging FIFO and Address Decode module. For each received transaction, a tag is generated in a tag generation module 206 and associated with each predetermined data, data stream, or address transaction that is output from the staging module 204.

In any of the embodiments herein, the tag can be any unique identification value, identification, and the like as known in the art. In one embodiment, the tag includes a unique data value, e.g., 8 bit data value or greater, associated with the data output from module 204.

The tag value is stored in a transaction scheduler module 208 (e.g., transaction scheduler 119 of FIG. 1). Additionally, during the execution of the associated transaction, the tag associated with the transaction is stored in the processing system components utilized in executing the transaction, e.g., controller 118.

Further, in accordance with the various processing flows depicted in FIG. 2, the tag value associated with a particular transaction may be associated with the transaction at every step during its execution and may be tracked by every resource associated with the execution of the transaction. Each transaction is processed in a transaction scheduler module 208 with an associated tag from the tag generation module 206.

The transaction scheduler module 208 is configured to determine a transaction queue that specifies an order in which transactions received on memory command channel 202 should be executed.

The tag checker module 210 is configured to check each transaction with each tag as described herein and if the transaction wins arbitration, then process the transaction. Optionally and/or alternatively, flow 200 may include a write channel and read channel, each with its own tag checker module. In such case, the new tag checker modules would communicate with each other for arbitration.

In this embodiment, the tag value stored by the operation can be compared to the tag value for the currently executing transaction stored by the transaction scheduler 208. If the two values are the same, that outcome indicates that the transaction is properly executed in accordance with the schedule established by transaction scheduler 208 and that the transaction is processed. If, however, the tag values being compared by tag checker 210 and the tag assigned to the transaction do not match, that condition may indicate a fault that affected the scheduler and processed transactions. In one embodiment, the fault may be that the transaction has been executed out-of-order (or that another non-sequential error occurred), potentially indicating that incorrect data may have been stored or read by operation or that the data may have been stored into an incorrect address in memory.

Faults or errors can occur in a number of different ways, including non-matching or mis-matching tags, timeout transactions, e.g., when an address transaction does not leave the transaction scheduler module 208, and lost or misplaced tags on reallocation, e.g., something happened in transaction scheduler module 208, e.g., assumed a fault didn't clear and duplicate transaction. These faults will be described herein with reference to FIGS. 4-6 and occur in the process data flows of FIGS. 2 and 3. The system flow 200 can also include multiple tag checkers in other processes, e.g., a write channel and a read channel.

Figure 3:
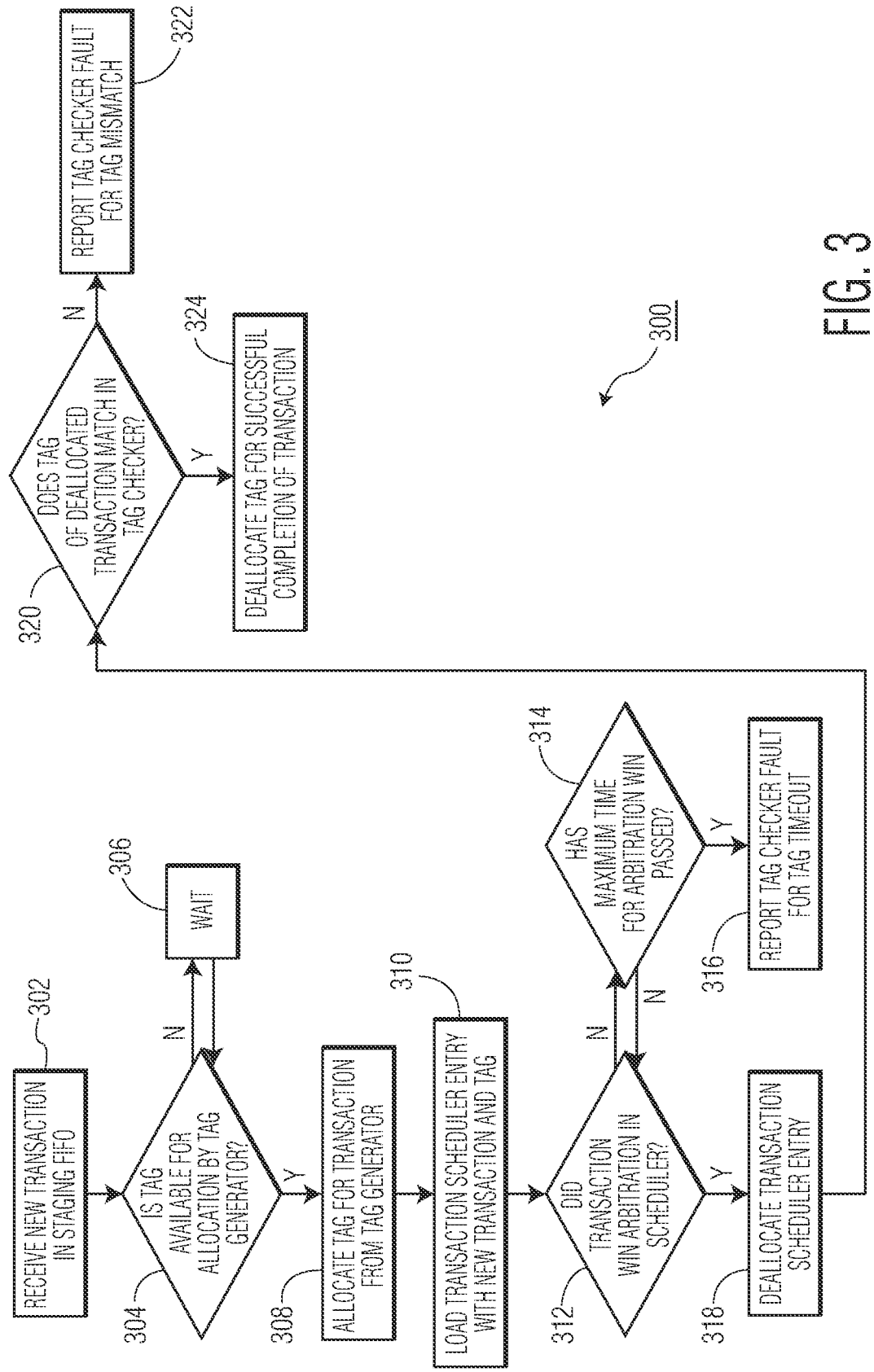
FIG. 3 illustrates, in simplified flowchart diagram form, an exemplary data processing flow in accordance with another embodiment of the present invention.

FIG. 3 illustrates an exemplary data processing flow in simplified flowchart diagram form in accordance with another embodiment of the present invention.

Referring to FIG. 3, in step 302, a new transaction is received in staging area 204. In step 304, controller 118 determines if a tag is available for allocation by a tag generator module 206. If it is determined a tag is available for allocation, the tag generator module 206 allocates a tag for the transaction (step 308). If it is determined a tag is not available for allocation, the system waits for a predetermined amount of time, e.g., a predetermined number of clock cycles (step 306), and repeats step 304. In step 310, a transaction with a tag is loaded into the transaction scheduler module 208 (119 of FIG. 1). In step 312, controller 118 via the transaction scheduler module 208 determines if the transaction wins arbitration. If a transaction wins arbitration in step 312, the transaction is deallocated from the transaction scheduler module 208 (step 318). If a transaction has not won arbitration and a maximum time for arbitration has not passed (step 314), the system continues to determine if a transaction wins arbitration (step 312). If a predetermined amount of time has passed (step 314), then a fault is generated as the transaction has timed out from the transaction scheduler module 208 (step 316). In step 318, after the transaction, the tag and the transaction are deallocated in the tag scheduler 208. In step 320, the system determines via transaction scheduler module 208 whether a deallocated transaction has an allocated tag in the transaction scheduler with a tag checker module 210. If tag checker module 210 determines no match between a transaction that just won arbitration and the existing allocated tag, a fault is generated (step 322). If tag checker module 210 determines a match for a deallocated transaction and a tag, the transaction is successful (step 324).

Figure 4:
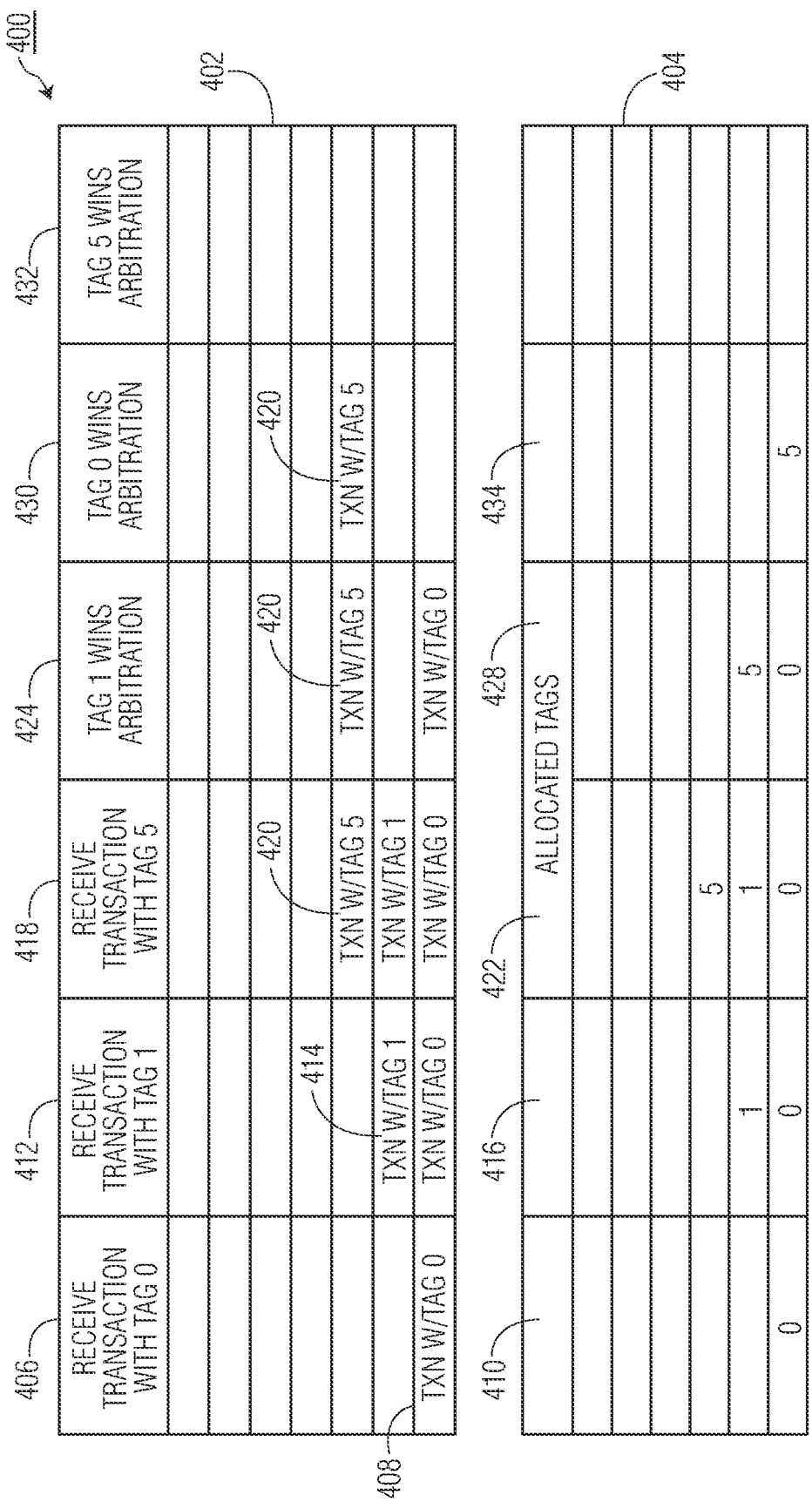
FIG. 4 illustrates an exemplary data processing flow table in accordance with an embodiment of the present invention.

In FIG. 4, table 402 represents the data flow for a transaction scheduler that receives a request to execute a number of transactions. Each column within table 402 represents a distinct time, so the columns of table 402 from left to right depict how transactions are received and processed over time. Each column of table 404 displays a number of tags that have been the number of allocated tags at different times or events.

At event 406, a transaction 408 with a unique tag value represented as 0 is received into the transaction scheduler, and at that point, there is only one tag allocated, as shown in column 410. At event 412, another transaction 414 with a unique tag value represented as 1 is received in the transaction scheduler, and at that point there are two tags allocated as shown in column 416. At another event 418, a transaction 420 with a unique tag value represented as 5 is received in the transaction scheduler, and at that point, there are three tags allocated, as shown in column 422, where each tag is associated with a particular transaction.

At event 424, transaction 414 wins arbitration between transactions 408 and 420 and is executed. At that point, therefore, transaction 414 is processed, and the tag 1 is deallocated and can be reused by the system. As shown in column 428, there are now only two tags allocated, tag 5 and tag 0. Next, at event 430, transaction 408 is processed as a tag value 0 for transaction 408 is found. Tag value 0 is deallocated, and there is only tag 5 remaining, as shown in column 434. Finally, at event 432, transaction 420 wins arbitration when a tag value 5 match is found.

At the conclusion of the data flow depicted by FIG. 4, therefore, three transactions have been executed (i.e., transaction 408, transaction 414, and transaction 420). All transactions were successfully executed such that the tags associated with those transactions are successfully deallocated with no tag allocations remaining after competition of all received transactions.

Figure 5:
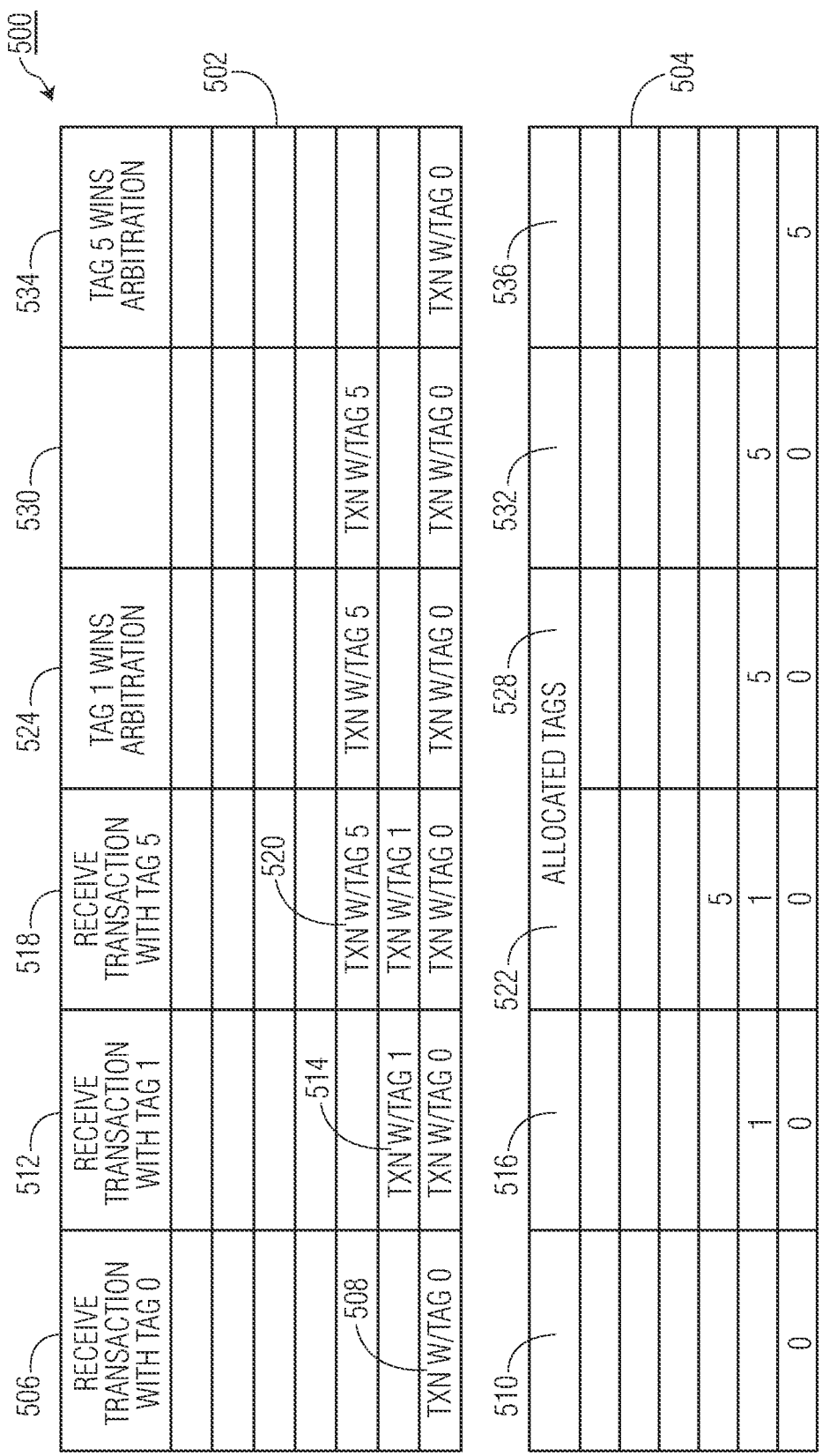
FIG. 5 illustrates an exemplary data processing flow table in accordance with an embodiment of the present invention.

FIG. 5 illustrates an exemplary data processing flow table in accordance with an embodiment of the present invention. Referring to FIG. 5, table 500 depicts the data flow when processing a number of transactions, where each transaction is associated with a unique tag value. In this illustrative example, there is a fault case due to tag timeout in which a non-deallocated tag value remains within the transaction scheduler even after all available transactions have been designated for processing.

Referring to FIG. 5, the data flow is generally described with tag processing with reference to table 500. This data flow is divided into table 502, representing the data processing at different times or events, and table 504, showing the number of allocated tags at different times or events.

At event 506, a transaction 508 with a unique tag value represented as 0 is received in the transaction scheduler, and at that point, there is only a tag allocated as shown in column 510. At event 512, another transaction 514 with a unique tag value represented as 1 is received in the transaction scheduler and at that point, two tags are allocated as shown in column 516.

Next another event, 518 a transaction 520 with a unique tag value represented as 5 is received in the transaction scheduler and at that point there are three tags allocated as shown in column 522.

At event 524, transaction 514 wins the arbitration between transactions 508 and 520 as a match for tag value 1 is found. At this point, transaction 514 is processed and tag 1 is deallocated and can be reused by the system. As shown in column 528, there are now only two tags allocated, tag 5 and tag 0. Next, at event 530 transaction neither tag 5 or 0 is found, so nothing is processed. At column 532, both tags 5 and 0 are allocated.

At event 534, transaction 520 wins the arbitration as a match for tag value 5 is found. At this point, transaction 520 is processed, and the tag 5 is deallocated and can be reused by the system. As shown, in column 536, there is now only a single tag allocated, tag 0. Next, after several other events or clock cycles, transaction 508 remains unprocessed and tag 0 continues to be allocated. The system is configured to timeout or fault after a predetermined number of cycles and generate a fault.

Figure 6:
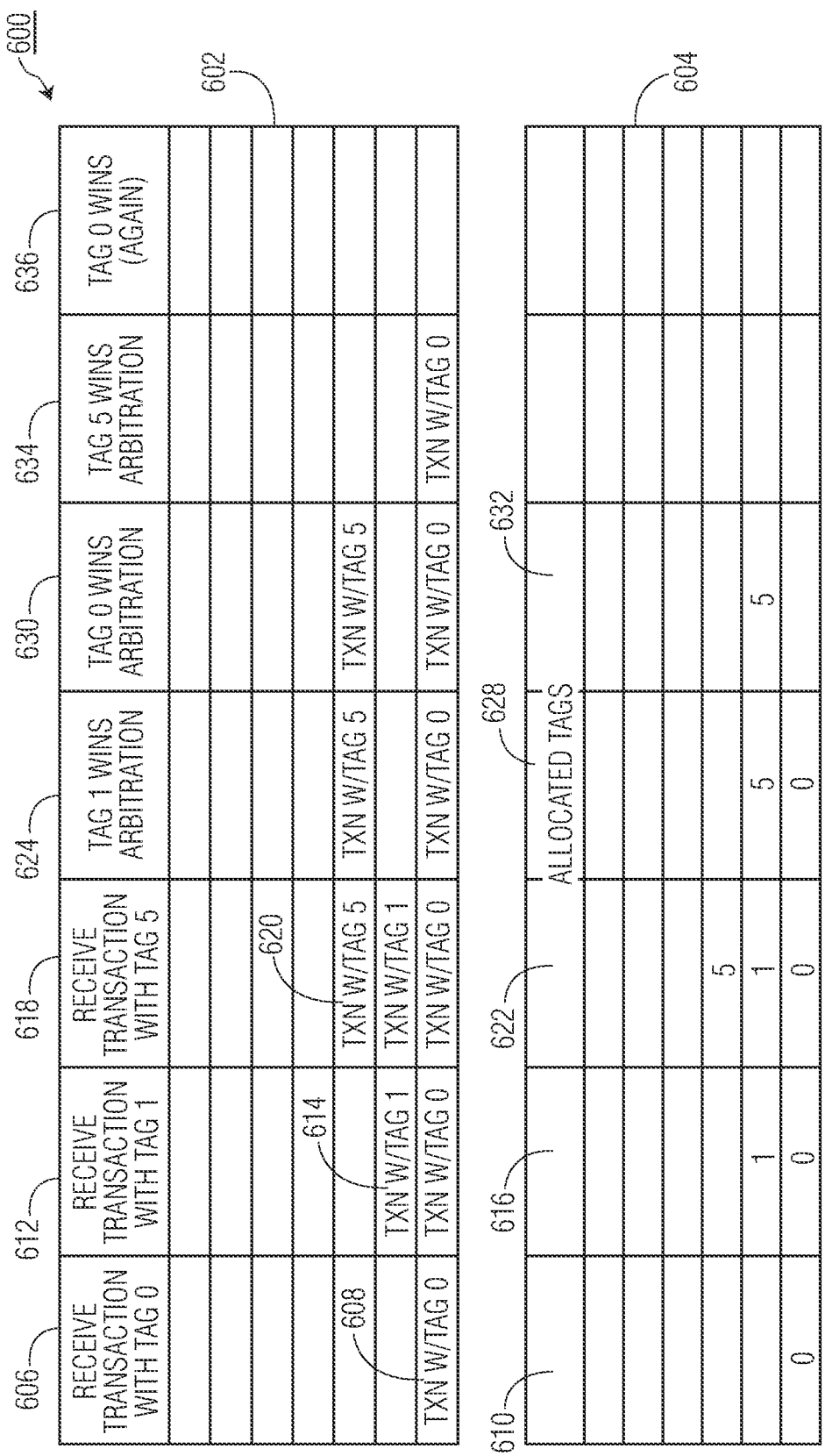
FIG. 6 illustrates an exemplary data processing flow table in accordance with an embodiment of the present invention.

FIG. 6 illustrates an exemplary data processing flow table in accordance with an embodiment of the present invention.

Referring to FIG. 6, the data flow is generally described with tag processing with reference to table 600. This data flow is divided into table 602 representing the data processing at different times or events and table 604 showing the number of allocated tags at the different times or events. In this illustrative example there is a fault case due to tag mismatch. The data structure is shown as a simplified version. Optionally and/or alternatively, the data can be in a shifting data structure, e.g., shifting new entries after entries win arbitration.

At event 606, a transaction 608 with a unique tag value represented as 0 is received in the transaction scheduler and at that point there is only one tag allocated as shown in column 610. At event 612 another transaction 614 with a unique tag value represented as 1 is received in the transaction scheduler and at that point there are two tags allocated as shown in column 616.

Next another event 618, transaction 620 with a unique tag value represented as 5 is received in the transaction scheduler and at that point there are three tags allocated as shown in column 622.

At event 624, transaction 614 wins the arbitration between transactions 608 and 620 as a match for tag value 1 is found. At this point, transaction 614 is processed and the tag 1 is deallocated and can be reused by the system. As shown in column 628, there are now only two tags allocated, tag 5 and tag 0. At event 630, transaction 608 wins the arbitration between transactions 608 and 620 as a match for tag value 0 is found. At this point, transaction 608 is processed and transaction 608 deallocated. The tag 0 can be deallocated in controller 118 and reused by the system. However, in this example, tag 0 was not deallocated due to a fault in the system. As shown in column 632, there is now only one tag allocated, tag 5.

At event 634, transaction 620 with tag 5 wins the arbitration and a match for tag value 5 is found. At this point, transaction 620 is processed and tag 5 is deallocated and can be reused by the system. At event 636, transaction 608 with tag 0 wins the arbitration again, but no match is found, and a fault is detected.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A data processing system, comprising:
   a transaction scheduler configured to process transactions;
   a controller configured to:
   receive a transaction request identifying a transaction;
   generate a unique tag value for the transaction request;
   load the unique tag value into the transaction scheduler;
   determine a current unique tag value associated with a transaction being executed; and
   generate a fault when one of:
   (i) the current unique tag value does not match any unique tag in the transaction scheduler after the transaction wins an arbitration; and
   (ii) the transaction times out after a predetermined number of cycles without being processed and the current unique tag value matches the unique tag value stored in the transaction scheduler.

2. The system of claim 1, wherein the fault is when (i) the current unique tag value is not found and the controller determines the transaction was executed in an unexpected order.

3. The system of claim 1, wherein the fault is when (i) the current unique tag value is not found and the controller determines the transaction was not deallocated.

4. The system of claim 1, wherein the fault is when (ii) the transactions timeout after a predetermined number of cycles the controller reports a tag timeout.

5. The system of claim 1, wherein the unique tag value comprises a data value.

6. A data processing system, comprising:
   a controller configured to:
   receive a transaction request identifying a transaction;
   generate a unique tag value for the transaction request;
   load the unique tag value into a transaction scheduler;
   determine a current unique tag value associated with the transaction being executed; and
   compare the current unique tag value to the unique tag value in the transaction scheduler and generate a fault when the current unique tag value and the unique tag value do not match after the transaction wins an arbitration.

7. The system of claim 6, wherein the controller comprises the transaction scheduler configured to process transactions, a tag control circuit coupled to the transaction scheduler, a tag generator coupled to the tag control circuit, and a tag checker coupled to the tag control circuit.

8. The system of claim 6, wherein the unique tag value comprises a data value.

9. The system of claim 6, wherein the fault further comprises an improper deallocation of the transaction.

10. A data processing system, comprising:
a transaction scheduler configured to process transactions; and
a controller configured to determine whether a fault corresponds to one or more of i) a mismatch in a unique tag value stored in a transaction scheduler and associated with a transaction and a current tag value of a current transaction after the current transaction wins an arbitration, ii) a time out of the current transaction after a predetermined number of cycles without being processed and the unique tag value matches the current tag value, and iii) a transaction that is not associated with a unique tag value stored in the transaction scheduler.

11. The system of claim 10, wherein the fault i) a mismatch in a unique tag value associated with a transaction and a current tag value of a current transaction due to a missing tag value.

12. The system of claim 10, wherein the fault ii) a timed out transaction due to an improper deallocation of a transaction.

13. The system of claim 12, wherein the timed out transaction is after a predetermined number of clock cycles.

14. The system of claim 10, wherein the fault iii) a transaction that is not associated with a unique tag value due to a failure to deallocate the transaction.

15. A method of operating a data processing system, comprising:
detecting a fault by comparing an output data with a first unique tag value from a transaction scheduler module with an input data with a second unique tag value input into a read buffer after a transaction associated with the second unique tag value wins an arbitration and generating an indication of the fault when the first unique tag value does not match the second unique tag value.

16. The method of claim 15, further comprising generating an interrupt signal corresponding to the fault, and responsive to the interrupt signal at a controller, invoking a service routine to analyze the fault.

17. The method of claim 15, further comprising based upon the fault not corresponding to a hard error, resetting a core domain and allowing other portions of the data processing system continue normal operation during reset of the core domain.

18. The method of claim of claim 15, further comprising using an ECC process to check a correctness of a group of data bits in the input data.

19. The method of claim of claim 15, further comprising using a lockstep process to check a correctness of a group of data bits in the input data.

* * * * *